United States Patent
Taron et al.

(10) Patent No.: US 10,095,729 B2
(45) Date of Patent: Oct. 9, 2018

(54) MANAGING STORAGE QUOTAS IN A SHARED STORAGE SYSTEM

(71) Applicant: Qumulo, Inc., Seattle, WA (US)

(72) Inventors: Philip Taron, Seattle, WA (US); Patrick Jakubowski, Seattle, WA (US); Remi Bernotavicius, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 15/474,047

(22) Filed: Mar. 30, 2017

(65) Prior Publication Data

US 2018/0165321 A1 Jun. 14, 2018

Related U.S. Application Data

(60) Provisional application No. 62/446,261, filed on Jan. 13, 2017, provisional application No. 62/432,554, filed on Dec. 9, 2016.

(51) Int. Cl.
*G06F 17/30* (2006.01)

(52) U.S. Cl.
CPC .. *G06F 17/30371* (2013.01); *G06F 17/30091* (2013.01); *G06F 17/30138* (2013.01); *G06F 17/30165* (2013.01)

(58) Field of Classification Search
CPC ........ G06F 17/30371; G06F 17/30138; G06F 17/30165
See application file for complete search history.

(56) References Cited

U.S. PATENT DOCUMENTS

| | | | |
|---|---|---|---|
| 8,046,378 B1* | 10/2011 | Zhuge | G06F 17/30082 707/783 |
| 2012/0066179 A1* | 3/2012 | Saika | G06F 3/061 707/634 |
| 2012/0096059 A1* | 4/2012 | Shimizu | G06F 3/061 707/828 |
| 2013/0227236 A1* | 8/2013 | Flynn | G11C 16/26 711/165 |
| 2015/0234879 A1* | 8/2015 | Baldwin | G06F 17/30342 707/694 |

* cited by examiner

*Primary Examiner* — Alicia M Willoughby
(74) *Attorney, Agent, or Firm* — John W. Branch; Lowe Graham Jones PLLC

(57) ABSTRACT

A facility for managing filesystem object storage quotas (i.e., size limits) in a storage environment is disclosed. The facility enables users to establish, modify, and remove quotas on directories and files within a filesystem. Each quota acts as a soft limit on the size of the associated filesystem object, including any child objects of the filesystem object. The facility improves the speed at which the system can test for and identify violations of quotas established for individual filesystem objects by using aggregation and reconciliation techniques rather than constantly traversing a filesystem in its entirety to test for violations of quotas.

18 Claims, 7 Drawing Sheets

MANAGING STORAGE QUOTAS IN A SHARED STORAGE SYSTEM

CROSS-REFERENCE TO RELATED APPLICATIONS

This application claims the benefit of U.S. Provisional Application No. 62/432,554 entitled "MANAGING STORAGE QUOTAS IN A SHARED STORAGE SYSTEM," filed on Dec. 9, 2016 and claims the benefit of U.S. Provisional Application No. 62/446,261 entitled "MANAGING STORAGE QUOTAS IN A SHARED STORAGE SYSTEM," filed on Jan. 13, 2017, each of which is herein incorporated by reference in its entirety. This application is related to U.S. Provisional Application No. 62/181,111 entitled "FILESYSTEM HIERARCHICAL CAPACITY QUANTITY AND AGGREGATE METRICS," filed on Jun. 17, 2015; U.S. Provisional Application No. 61/982,926 entitled DATA STORAGE SYSTEM," filed on Apr. 23, 2014; U.S. Provisional Application No. 61/982,931 entitled "DATA STORAGE SYSTEM," filed on Apr. 23, 2014; U.S. Non-Provisional application Ser. No. 14/595,043 entitled "FILESYSTEM HIERARCHICAL AGGREGATE METRICS," filed on Jan. 12, 2015; U.S. Non-Provisional application Ser. No. 14/595,598 entitled "FAIR SAMPLING IN A HIERARCHICAL FILESYSTEM," filed on Jan. 13, 2015; U.S. Non-Provisional application Ser. No. 14/658,015 entitled "DATA MOBILITY, ACCESSIBILITY, AND CONSISTENCY IN A DATA STORAGE SYSTEM," filed on Mar. 13, 2015; and U.S. Non-Provisional application Ser. No. 14/859,114, entitled FILESYSTEM HIERARCHICAL CAPACITY QUANTITY AND AGGREGATE METRICS, filed on Sep. 18, 2015, each of the above-mentioned applications is herein incorporated by reference in its entirety. In cases where the present application and a document incorporated herein by reference conflict, the present application controls.

TECHNICAL FIELD

The described technology is directed to the field of filesystems.

BACKGROUND

Enterprise filesystems can store large volumes of data on behalf of large numbers of users. These filesystems can have thousands of accounts, each account storing any amount of data. Enterprises, businesses, and individuals alike now use large scale filesystems to store data that is remotely accessible via a network, such as a cloud based storage environment. Such filesystems are often accessible via closed (e.g., enterprise) and open (e.g., Internet) networks and allow concurrent access via multiple client devices. Furthermore, the amount of data stored for a particular account may grow or shrink without notice.

DETAILED DESCRIPTION

Figure 1:
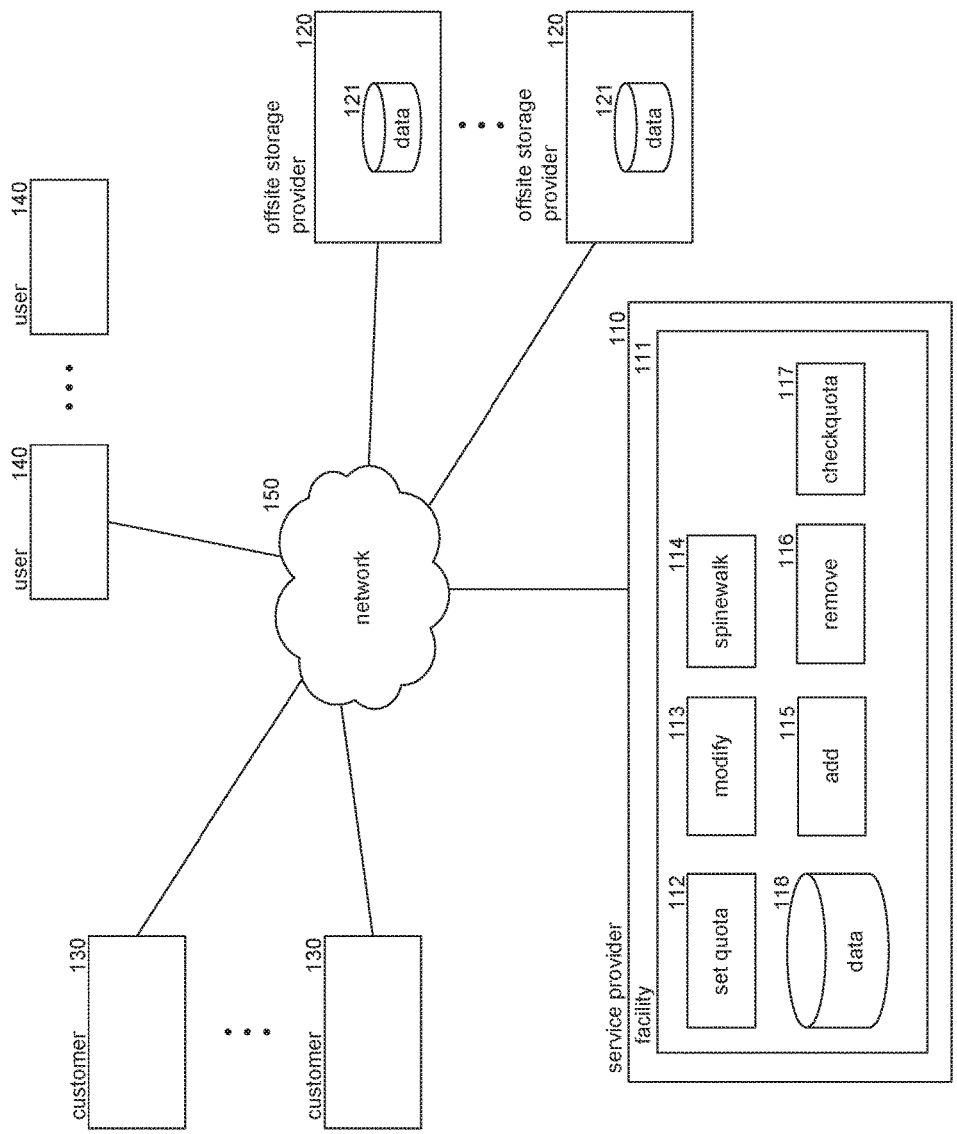
FIG. 1 is a block diagram illustrating an environment in which the facility may operate.

Users, such as account administrators, account holders, and/or storage system managers, benefit from being able to limit the amount of storage that consumers can use at any one time. For example, if a system administrator has allotted 10 GB of storage space in a shared file system with a capacity of 1000 GB to each of 100 users (i.e., a 10 GB quota per user), the system administrator may benefit from preventing each user from going over their allotted 10 GB. In this manner, the system administrator can ensure that each user has access to the amount of storage space that has been allotted to them and that one or more users are not unfairly or inappropriately taking up more than their fair share of storage space. As another example, even if the system administrator is not concerned with individual users surpassing 10 GB of storage usage, the system administrator may benefit from preventing the group of 100 users, as a whole, from going over the 1000 GB capacity of the shared file system. In this manner, the system administrator can ensure that the group does not violate any system wide restrictions on usage of storage space, such as a system wide 1000 GB quota, which may, for example, result in higher costs, degradation of service, and so on. The demand for scalable storage resources and the ability to provide rapid access to content stored thereby is a key concern to end-users. Furthermore, the ability to impose limits or quotas on the usage of this storage space is a concern to filesystem users, managers, and providers.

A facility for managing filesystem object storage quotas (i.e., size limits) in a storage environment is disclosed. The facility enables users to establish, modify, and remove quotas on directories and files within a filesystem. In the disclosed facility, each quota acts as a soft limit on the size of the associated filesystem object, including any child objects of the filesystem object. For example, a quota on a directory acts as a limit on the size of the contents of that directory and all of its subdirectories. The facility leverages the aggregation techniques described in, for example, U.S. Provisional Application No. 62/181,111 entitled "FILESYSTEM HIERARCHICAL CAPACITY QUANTITY AND AGGREGATE METRICS," filed on Jun. 17, 2015; U.S. Provisional Application No. 61/982,926 entitled DATA STORAGE SYSTEM," filed on Apr. 23, 2014; U.S. Provisional Application No. 61/982,931 entitled "DATA STORAGE SYSTEM," filed on Apr. 23, 2014; U.S. Non-Provisional application Ser. No. 14/595,043 entitled "FILESYSTEM HIERARCHICAL AGGREGATE METRICS," filed on Jan. 12, 2015, and U.S. Non-Provisional application Ser. No. 14/859,114, entitled FILESYSTEM HIERARCHICAL CAPACITY QUANTITY AND AGGREGATE METRICS, filed on Sep. 18, 2015, each of which is herein incorporated by reference in its entirety, to provide improved techniques for managing quotas within a filesystem. For example, because the disclosed filesystem itself maintains aggregate values such as size for individual directories, the facility can manage and enforce quotas without having to traverse an entire file structure every time a change is made in the filesystem. In this manner, the facility improves the speed at which the system can test for and identify violations of quotas established for individual filesystem objects—such as directories and files—and reduces the processing resources need to do so.

In some embodiments, the facility maintains each quota enforcement status using an enforcement (or enforcing) bit. Furthermore, because a filesystem object without its own quota can be subject to the quota of an ancestor filesystem object (e.g., a parent directory), an enforcement bit can bet set for any filesystem object that is directly or indirectly subject to a quota. Thus, if a directory that has a quota is currently violating its quota, every descendent of the violating directory can be marked to indicate that it is subject to a quota that is currently being enforced. In this manner, the enforcement bit for a filesystem object indicates whether the filesystem (or any of its ancestors) is currently in violation of its associated quota. In some embodiments, the enforcement bit is stored in metadata or an inode associated with the corresponding filesystem object. When the enforcement bit for a quota is set (e.g., equal to true or '1'), the facility is enforcing an associated quota and, therefore, the facility will deny any requests to increase the size of any file and/or directory that impacted by the quota. For example, the facility will prevent attempts to 1) add metadata to an "enforcing" file or directory, 2) create new directories or files within an "enforcing" directory, 3) hard link files to an "enforcing" directory, 4) write additional information to a file within an "enforcing" directory, and so on. The facility can, however, allow modifications that do not increase the size of the data subject to the quota, such as writes that decrease the size of a file or directory and/or writes that do not change the size of a file or directory. When the enforcement bit is not set (e.g., equal to false or '0'), the facility is not enforcing any associated quota and, therefore, the corresponding filesystem object is not subject to any quota that is currently being violated and, therefore, the facility will allow requests to increase the size of any file and/or directory that effects the quota.

In some embodiments, the facility uses a system "epoch" counter to manage quotas. Each system epoch represents a period of time in which the facility can determine that the enforcement status of any file or directory within the quota system has not changed. Thus, when an operation occurs that will cause a non-enforcing filesystem object to surpass its quota, the facility, among other things, increments the system epoch counter to establish a new system epoch. Similarly, when an operation occurs that will cause an enforcing filesystem object to drop below its quota, the facility, among other things, increments the system epoch counter to establish a new system epoch. When a requested modification to a filesystem object that is not enforcing causes the filesystem object to surpass its quota, the facility allows the modification but registers a "quota event." Similarly, when a requested modification to a filesystem object that is enforcing causes the filesystem object to go under its quota, the facility allows also registers a "quota event". The facility registers these "quota events" by incrementing the system "epoch" counter. In addition to events that cause a filesystem object to go over or under its quota, in some embodiments the facility increments the system epoch counter in response to other events, such as any changes to a quota, including creating a quota, updating a quota, deleting a quota, increasing a quota, decreasing a quota, and so on; moving a directory from one directory to another directory (so that it has a new parent directory), etc.

In addition to the system epoch, in some embodiments the facility maintains, for each filesystem object subject to a quota, an indication of an epoch during which the enforcement status of the filesystem object was last determined to have changed. For example, if the size of an enforcing directory drops below its quota during "epoch 2," the facility stores an indication of "epoch 2" in association with the directory (e.g., in an inode or other metadata associated with the directory) and increments the current epoch to 3. Maintaining epoch values for individual filesystem objects enables the facility to determine whether enforcement bits for individual quotas can be trusted. Accordingly, the facility can maintain quotas for individual filesystem objects without needing to traverse the entire filesystem to determine whether any filesystem objects are in violation of the quota, thereby providing a substantial improvement over conventional quota management systems.

In some embodiments, during aggregate reconciliation, the filesystem updates filesystem object epoch information based on the current state of the filesystem object during reconciliation. For example, if, during reconciliation, the facility determines that the aggregate size of a filesystem object is larger than its quota and the filesystem object is not enforcing, the facility can adjust system and object epoch values accordingly. Aggregate reconciliation is further discussed in, for example, U.S. Non-Provisional application Ser. No. 14/595,043 entitled "FILESYSTEM HIERARCHICAL AGGREGATE METRICS," filed on Jan. 12, 2015 and U.S. Non-Provisional application Ser. No. 14/859,114, entitled FILESYSTEM HIERARCHICAL CAPACITY QUANTITY AND AGGREGATE METRICS, filed on Sep. 18, 2015, each of which is herein incorporated by reference in its entirety.

The epoch information enables the facility to quickly and easily determine whether quota enforcement information associated with a particular filesystem object is up to date. This is especially useful when adding information to the filesystem. If the filesystem receives a request to add information to a filesystem object that is not enforcing, the facility can allow the operation unless the epoch associated with the filesystem object (i.e., the most recent epoch during which the enforcement bit was changed for the filesystem object) is different from the current epoch. This is because if these two values are the same, the facility can trust that no filesystem object has changed its associated quota enforcement status at least since the filesystem object to be modified was last updated.

For example, if none of the filesystem objects in the system are enforcing and a requested write to a file with the path /usr1/dir1/file1 and a size of 100 GB during epoch "3" would put either the /usr1 directory or the /usr1/dir1 directory over its quota, then the filesystem would (1) allow the write, (2) set the enforcing bit of each of the directories that are now in violation of its quota, (3) set the epoch of the directory or directories that are now in violation of the quota to "3"—the current epoch—, and (4) increment the system epoch counter to "4." Similarly, if the /usr1 directory and the /usr1/dir1 directories were enforcing (i.e., had their enforcement bits set) and a requested write to a file with the path /usr1/dir1/file1 during epoch "20" would put either the /usr1 directory or the /usr1/dir1 directory under its quota, then the filesystem would (1) allow the write, (2) clear the enforcing bit of each of the directories that are no longer in violation of its quota, (3) set the epoch of the directory or directories that are no longer in violation of the quota to "21"—the current epoch—, and (4) increment the system epoch counter to "22." Because the disclosed file system maintains aggregate metrics for individual directories, the facility need not necessarily traverse an entire file structure to determine the size of a directory.

In some embodiments, the facility notifies or alerts users when a quota is violated or is close to being violated. For example, the facility may send a message (e.g., email, SMS message, system message) to an end user or system administrator when the size of a filesystem object reaches a predetermined percentage of its quota (e.g., 33%, 50%, 75%, 90%, 95%). In some embodiments, individual quotas may have different notification percentages stored in, for example, metadata or an inode associated with a corresponding filesystem object. For example, "/usr1/dir1" may have a notification percentage of 80% while "/usr1" has a notification percentage of 95%. Furthermore, the notifications may occur during aggregate reconciliation. In some cases the notification may be transmitted over a wireless communication channel to a wireless device associated with a particular user or users (e.g., a system administrator, an owner of an account whose quota has been violated, etc.) based upon an address or addresses associated with the particular user or users. The notification may be used to activate a user application to cause the notification to display on a remote user computer system and to enable connection, via a link or other identifier in the notification, to the quota management facility over the Internet when the wireless device is connected (e.g., locally) to the remote user computer system and the remote user computer system comes online.

Additionally, in some embodiments the facility provides reports for any number of quotas in the quota management system, such as a percentage of the quota currently being used by the corresponding filesystem objects. In some cases, the facility aggregates quota values for directory, quota enforcement bits, and so on and store these aggregations in metadata or an inode for a directory. For example, an aggregated quota enforcement bit can be used to indicate whether any subdirectories of a given directory (the directory associated with the aggregated value) are enforcing their quota. As another example, an aggregated quota value may provide an indication of the subdirectory of the given directory with the highest percentage of its quota used, the unused percentage, the lowest net amount of unused quota space, and so on.

In some cases, the facility may employ quota templates, which establish default quota values for newly created filesystem objects subject to the quota template (e.g., newly created directories under a parent directory assigned to a particular quota template). For example, a user may establish a quota template for the root directory that specifies that any new subdirectory of the root directory will be created with a quota of a specified value (e.g., 1 GB, 5 GB, 100 GB, 1 TB, 50 TB, and so on); a specified percentage of the root directory's quota (e.g., 10%, 20%, 50%, and so on); a specified percentage of the root directory's unused quota; and so on. In some embodiments, the facility may track a count of the number of quotas that are currently being violated to further minimize processing. For example, if the count is currently 0 then the facility could bypass checking whether any quotas are currently violated.

The disclosed technology offers several benefits over other techniques for managing quotas in a shared storage system, such as a shared filesystem. In other quota management systems, the system must traverse a user's entire filesystem when changes are made to ensure that the user has not surpassed the user's quota. This traversal can take up valuable resources in the corresponding system, thereby delaying the execution of other operations in the filesystems. In some cases, other quota management systems "slow down" a user's ability to perform filesystem operations as the user approaches the user's quota to ensure that the quota management system has sufficient time to confirm that the user will not violate the user's quota if a particular operation is performed. For example, the quota management system may only allow a user to perform one write operation per traversal of the filesystem to ensure that the user has not (or will not) violate the user's quota. The installation and use of the disclosed quota management facility, in contrast, enables an organization or other party to create, manage, and enforce quotas within a storage system without necessarily requiring traversal of a user's portion of a storage system and without slowing down a user's access to the storage system, even as the user approaches the user's quota. Thus, the disclosed facility improves the ability of computers to maximize the usefulness of a shared storage system to users while simultaneously managing quotas within the storage system.

FIG. 1 is a block diagram illustrating an environment in which the facility may operate in accordance with some embodiments of the disclosed technology. The environment 100 includes service provider 110, offsite storage providers 120, customers 130, users 140, and network 150. Service provider 110 provides the facility for analyzing and visualizing trends within a filesystem and is comprised of facility 111, which includes set quota component 112, modify component 113, spinewalk component 114, add component 115, remove component 116, checkquota component 117, and data store 118. Set quota component 112 is invoked by the component to set or remove a quota for a filesystem object. Modify component 113 is invoked by the facility to modify a filesystem object in accordance with the quota management techniques described herein. Spinewalk component 114 is invoked by the modify component to test whether any of the filesystem object in a path string are enforcing their respective quotas. Add component 115 is invoked by modify component 113 to add information to a file system subject to the quota management system described herein. Remove component 116 is invoked by modify component 113 to remove information to a file system subject to the quota management system described herein. Checkquota component 117 is invoked by a reconciliation component to update quota information for filesystem objects subject to the disclosed quota management system. In some embodiments, data store 118 may include additional stores, such as remote or distributed storage systems, and so on. Offsite storage providers 120 offer storage space for the filesystem and are comprised of data store 121. Accordingly, in various embodiments, the facility is configured to manage quotas for distributed and non-distributed filesystems. Customers 130 represent the filesystem accountholders and may include individuals, organizations, system administrators, and so on. These customers may have established relationships with the service provider 110 and/or offsite storage providers 120 and may interact with their corresponding filesystems directly or via network 150. Users 140 represent the users that interact with the filesystem, either directly or via network 150.

The computing devices on which the facility is implemented may include a central processing unit, memory, input devices (e.g., keyboard and pointing devices), output devices (e.g., display devices), and storage devices (e.g., disk drives), such as computer-readable storage media. Computer-readable storage media include, for example, tangible media such as hard drives, CD-ROMs, DVD-ROMs, and memories such as ROM, RAM, and Compact Flash memories that can store instructions and other storage media. The phrase "computer-readable storage medium" does not include propagating, transitory signals and should not be interpreted as propagating, transitory signals. In addition, the instructions, data structures, and message structures may be stored or transmitted via a data transmission medium, such as a signal on a communications link and may be encrypted. The term "data transmission medium" should not be interpreted as computer-readable storage media. Various communications links may be used, such as the Internet, a local area network, a wide area network, a point-to-point dial-up connection, a cell phone network, and so on and may be encrypted.

Embodiments of the facility may be implemented in and used with various operating environments that include personal computers, server computers, handheld or laptop devices, multiprocessor systems, microprocessor-based systems, programmable consumer electronics, digital cameras, network PCs, minicomputers, mainframe computers, computing environments that include any of the above systems or devices, and so on.

The facility may be described in the general context of computer-executable instructions, such as program modules, executed by one or more computers or other devices. Further, such functions correspond to modules, which are software, hardware, firmware, or any combination thereof. Multiple functions can be performed in one or more modules as desired, and the embodiments described are merely examples. A digital signal processor, ASIC, microprocessor, or any other type of processor operating on a system, such as a personal computer, server computer, supercomputing system, router, or any other device capable of processing data including network interconnection devices executes the software. Those skilled in the art will appreciate that any logic illustrated in the Figures (e.g., flow diagrams), may be altered in a variety of ways. For example, the order of the logic may be rearranged, sublogic may be performed in parallel, illustrated logic may be omitted, other logic may be included, etc. Typically, the functionality of the program modules may be combined or distributed as desired in various embodiments.

While computer systems configured as described above are typically used to support the operation of the facility, those skilled in the art will appreciate that the facility may be implemented using devices of various types and configurations, and having various components. Furthermore, while various embodiments are described in terms of the environment described above, those skilled in the art will appreciate that the facility may be implemented in a variety of other environments including a single, monolithic computer system, as well as various other combinations of computer systems or similar devices connected in various ways.

Figure 2:
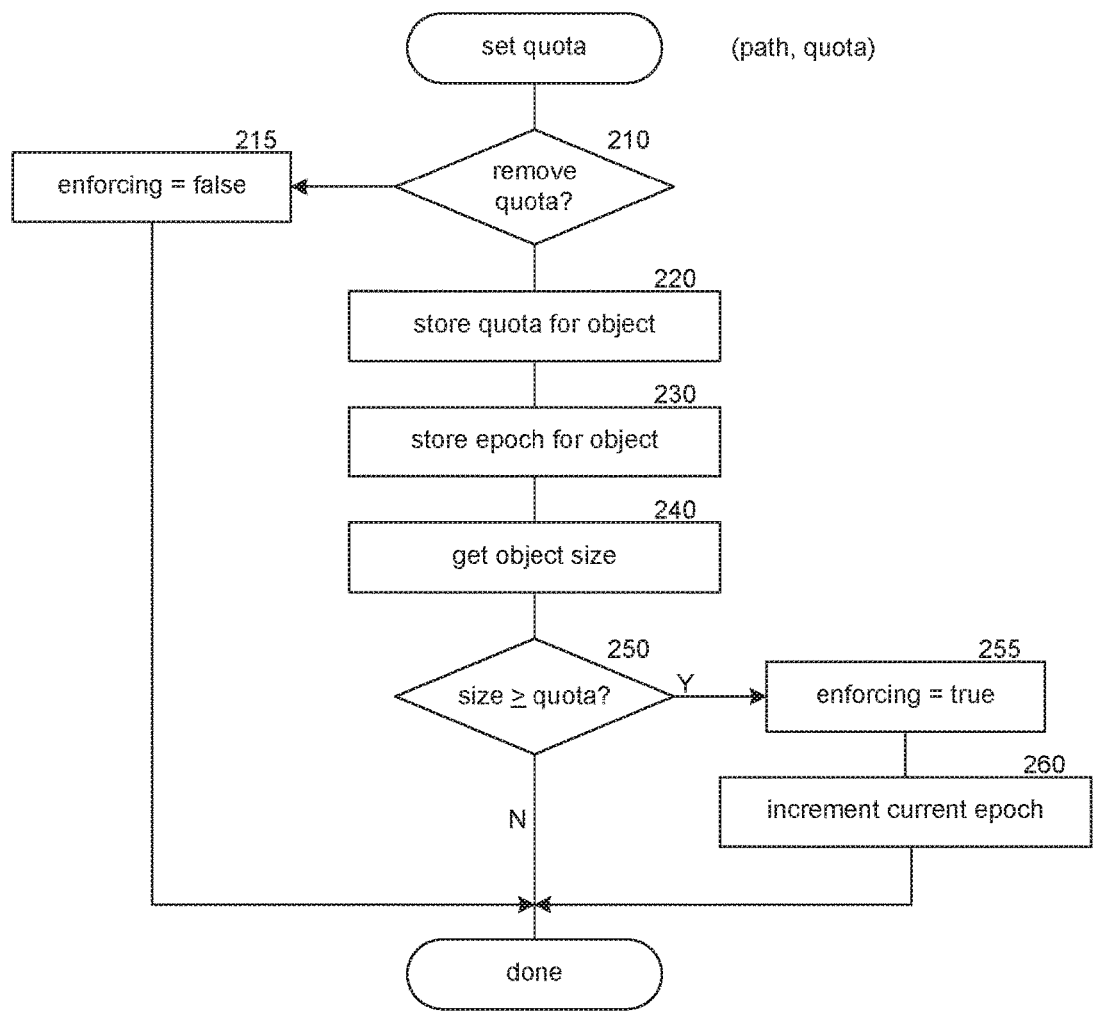
FIG. 2 is a flow diagram illustrating the processing of a set quota component.

FIG. 2 is a flow diagram illustrating the processing of a set quota component in accordance with some embodiments of the disclosed technology. The set quota component is invoked by the facility to set or remove a quota for an individual filesystem object. In this example, the component receives a "path" string to the filesystem object and a "quota" value to be assigned to the filesystem object. In some embodiments, the receipt of a special quota value such as a negative quota value or a separate flag may be used to indicate that the quota is to be removed. In decision block 210, if the quota is being removed then the component continues at block 215, else the component continues at block 220. In block 215, the component clears the enforcing bit for the corresponding filesystem object (i.e., the filesystem object corresponding to the retrieved path string) by, for example, clearing or setting the enforcing bit to false. In block 220, the component stores the received quota value in association with the filesystem object. For example, the component may store the quota value in a table referenced via the filesystem object, in an inode object associated with the filesystem object, and so on. In block 230, the component stores the current system epoch counter value in association with the filesystem object. For example, the component may store the current system epoch counter value in a table referenced via the filesystem object, in an inode object associated with the filesystem object, and so on. In block 240, the component retrieves the current size of the filesystem object. For example, if the filesystem object is a directory the component may retrieve the size of the filesystem object from an aggregate value of the filesystem object stored in metadata or an inode associated with the filesystem object. In decision block 250, if the retrieved size of the filesystem object is greater than or equal to the quota value then the component continues at block 255, else processing of the component completes. In block 255, the component sets the enforcing bit for the filesystem object by, for example, setting the enforcing bit to true. In block 260, the component increments the system epoch counter and then completes. In some embodiments, a means for setting a quota for a filesystem object comprises one or more computers or processors configured to carry out an algorithm disclosed in FIG. 2 and this paragraph in the order described therein.

Figure 3:
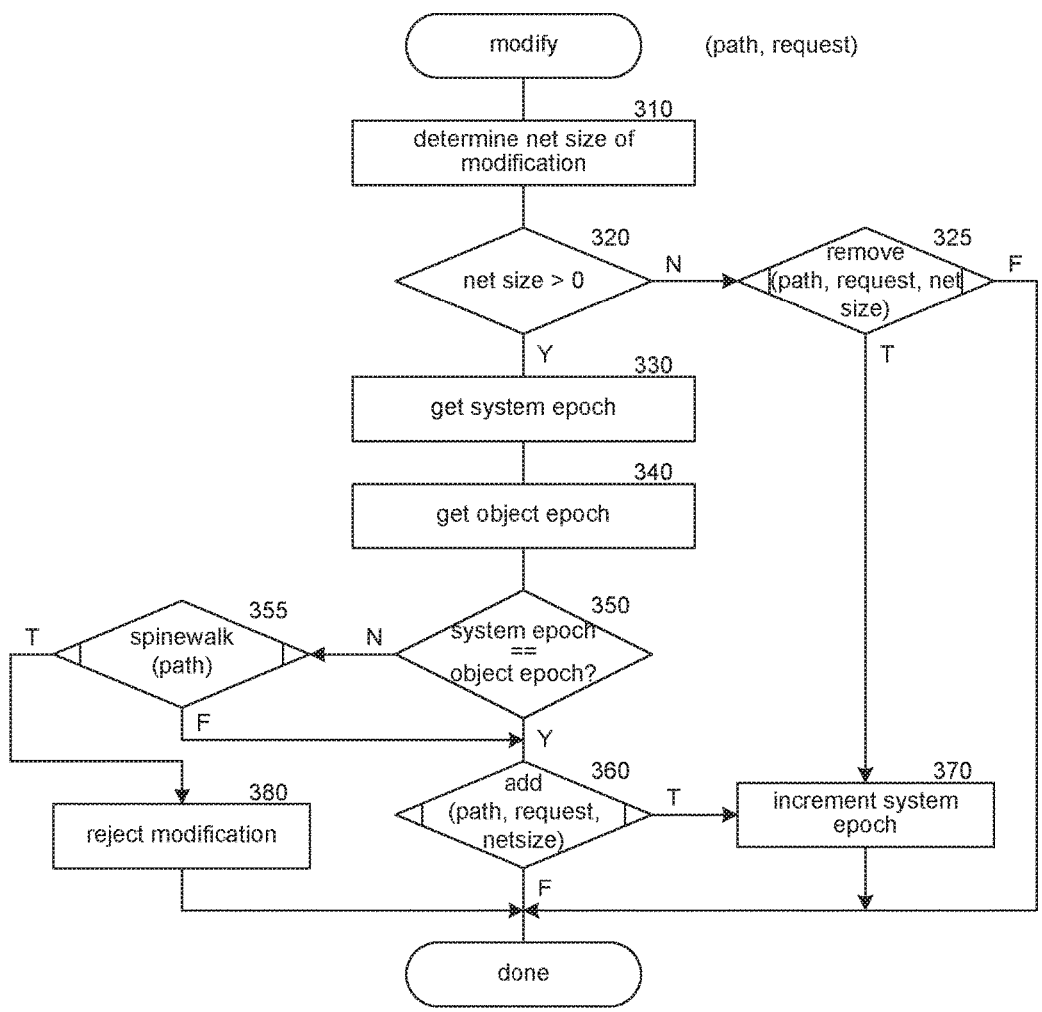
FIG. 3 is a flow diagram illustrating the processing of a modify component.

FIG. 3 is a flow diagram illustrating the processing of a modify component in accordance with some embodiments of the disclosed technology. The modify component is invoked by the facility in response to a request to modify (e.g., write or delete) a filesystem object in accordance with the quota management techniques described herein. In this example, the component receives a "path" string identifying the filesystem object to be modified. In block 310, the component determines the net size of the modification. For example, if the modification is to add 10 GB to a directory, then the net size of the modification is +10 GB; if the modification is to delete 5 GB from a directory, then the net size of the modification is −5 GB; if the modification is to replace 100 MB of data with 20 MB, then the net size of the modification is −80 MB. In decision block 320, if the determined net size is greater than 0 (i.e., if the modification would increase the size of the filesystem object), then the component continues at block 330, else the component continues at decision block 325. In decision block 325, the component invokes a remove component for the filesystem object. If the remove component returns a value of true, indicating that the invocation of the remove component created a new epoch, then the component continues at block 370, else the component completes. In block 330, the component retrieves the current system epoch counter. In block 340, the component retrieves the object epoch for the filesystem object. For example, the component may access an inode or metadata associated with the filesystem object to retrieve the object epoch for the filesystem object. In block 350, if the current system epoch counter is equal to the retrieved object epoch, the component continues at decision block 360, else the component continues at decision block 355. In decision block 355, the component invokes a spinewalk component for the filesystem object to determine whether any filesystem objects in the path of the filesystem object have already violated their quotas. If the spinewalk component returns a value of true, indicating that at least one quota of the filesystem objects is being enforced, then the component continues at block 380, else the component continues at decision block 360. In block 380 the component rejects the request to modify the filesystem object and then completes. In decision block 360, the component invokes an add component for the filesystem object. If the add component returns a value of true, indicating that the invocation of the add component created a new epoch, then the component continues at block 370, else the component completes. In block 370, the component increments the system epoch and then completes. In some embodiments, a means for performing a modification of a filesystem object comprises one or more computers or processors configured to carry out an algorithm disclosed in FIG. 3 and this paragraph, in some cases in the order described therein.

Figure 4:
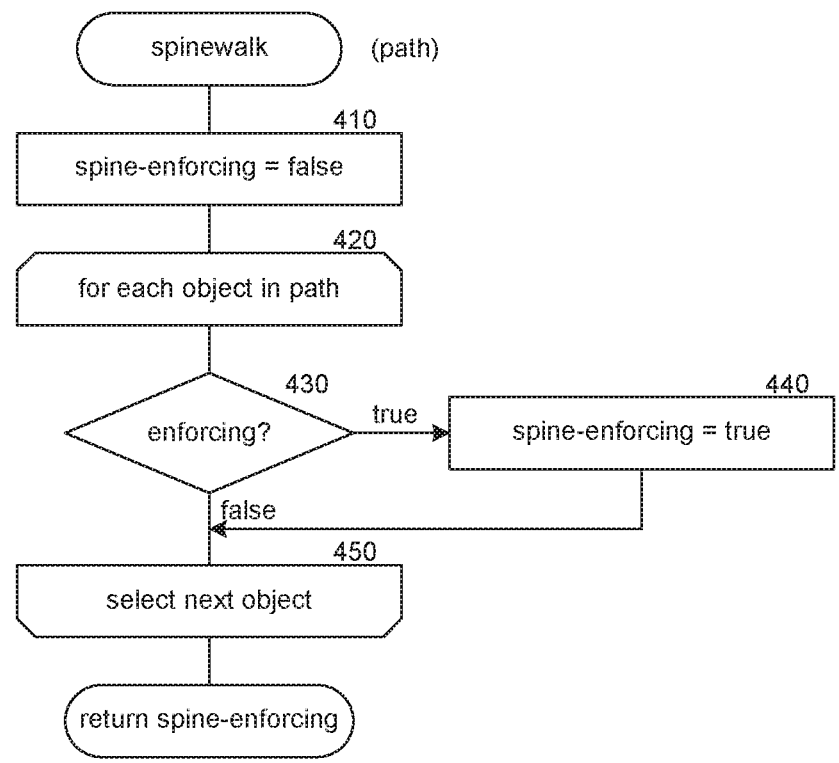
FIG. 4 is a flow diagram illustrating the processing of a spinewalk component.

FIG. 4 is a flow diagram illustrating the processing of a spinewalk component in accordance with some embodiments of the disclosed technology. The spinewalk component is invoked by the modify component to test whether any of the filesystem objects in a path string are subject to a quota that is currently being enforced. In this example, the component receives a "path" string to the filesystem object. In block 410, the component initializes a spine-enforcing variable to false. The spine-enforcing variable is used to determine whether any filesystem objects in the path are currently enforcing its associated quota. In blocks 420-450, the component loops through each of the filesystem objects in the received path, starting with the highest filesystem object (e.g., at the root directory) to determine whether it is subject to any quota that is currently being violated (i.e., that is currently being enforced). In decision block 430, if the currently-selected filesystem object is enforcing, then the component continues at block 440, else the component continues at block 450. In block 440, the component sets the spine-enforcing variable to true and then continues at block 450. In block 450, the component selects the next filesystem object of the path, if there are any remaining, and then loops back to block 420 to test the next filesystem object. If there are no filesystem objects of the path left to be processed then the component returns the spine-enforcing variable. For example, if the component received the path "/usr1/dir1/dir2/file1," the component would check each of the file filesystem objects represented by the path (i.e., "/" (the root directory), "/usr1/," "/usr1/dir1/," "/usr1/dir1/dir2/," and "/usr1/dir1/dir2/file1,") to determine whether any of these filesystem objects are currently in violation of a quota. In some embodiments, a means for performing a spinewalk of a filesystem object comprises one or more computers or processors configured to carry out an algorithm disclosed in FIG. 4 and this paragraph in the order described therein.

Figure 5:
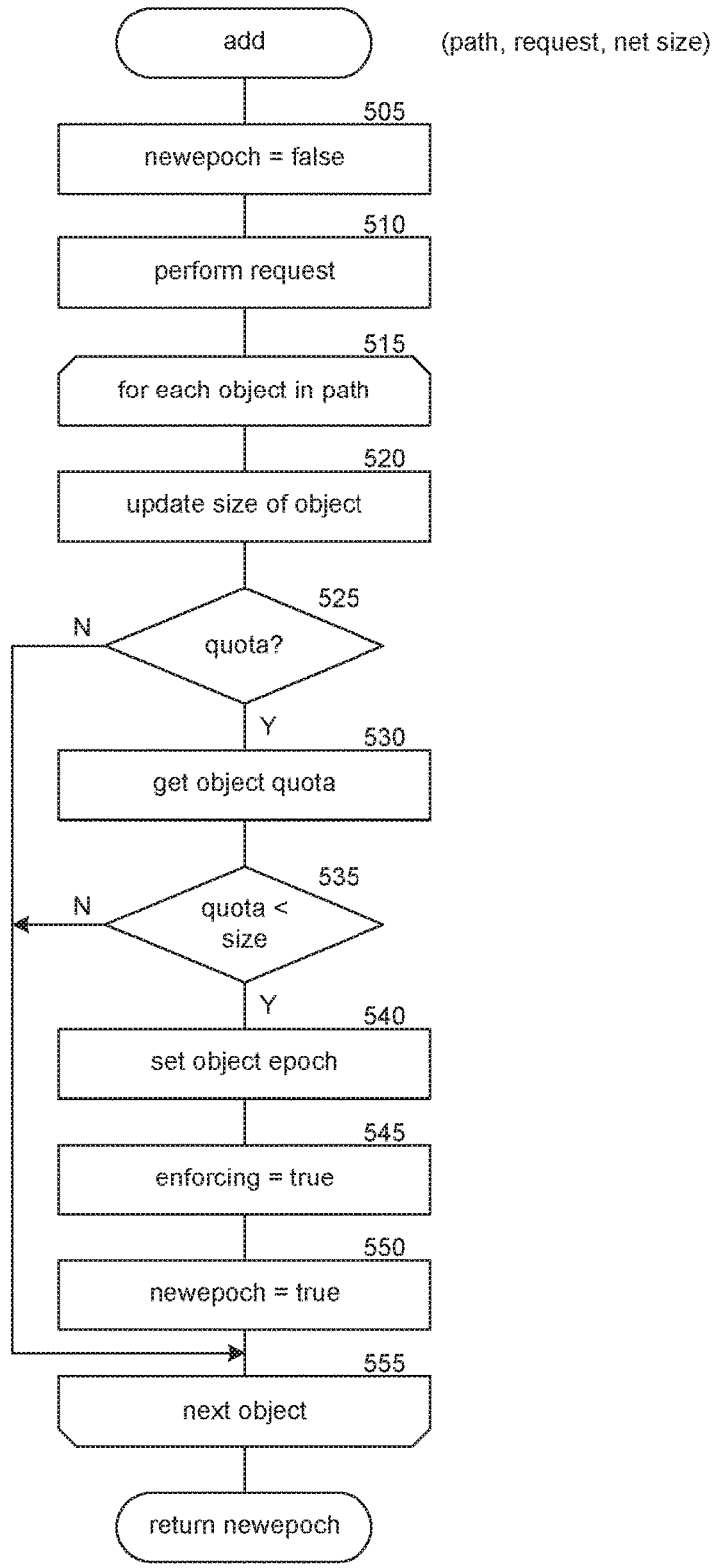
FIG. 5 is a flow diagram illustrating the processing of an add component.

FIG. 5 is a flow diagram illustrating the processing of an add component in accordance with some embodiments of the disclosed technology. The add component is invoked by a modify component to add information to a filesystem subject to the quota management system described herein in response to a request to modify a filesystem object. In this example, the component receives a "path" string to the filesystem object, a "net size" value corresponding to the net size of the information to be added to the filesystem, and an indication of the requested modification. In block 505, the component initializes a newepoch variable to false. In block 510, the component performs the modification request (e.g., performs the requested write or writes to the filesystem object). In blocks 515-555, the component loops through each filesystem object in the path to update size information for the selected filesystem object and to determine whether the modification will cause the selected filesystem object to violate its quota. In block 515, the component selects the next filesystem object in the path, starting with the filesystem object that is the target of the modification request (i.e., the filesystem object identified by the received path string). In block 520, the component updates the size of the currently-selected filesystem object based on, for example, the net size of the requested modification. For example, if the currently-selected filesystem object is a directory, then the component updates an aggregate size of the currently-selected filesystem object by adding the netsize value to the current aggregate value. In some cases, the component may skip block 520 if, for example, the filesystem object is a file with no aggregated values. In decision block 525, if the currently-selected filesystem object has its own quota, then the component continues at block 530, else the component continues at block 555. In block 530, the component retrieves the quota for the currently-selected filesystem object. In decision block 535, if the retrieved quota is less than the updated size of the currently-selected filesystem object (i.e., if the modification caused the currently-selected filesystem object to violate its quota), then the component continues at block 540, else the component continues at block 555. In block 540, the component sets the object epoch of the currently-selected filesystem object to the current system epoch counter value. In block 545, the component sets the enforcing bit for the currently-selected filesystem object to true. In block 550, the component sets the newepoch variable to true. In block 555, the component selects the next filesystem object in the path, if there are any remaining, and then loops back to block 515 to update size information for the next filesystem object and to determine whether the modification has caused it to violate its quota. If no filesystem objects in the path are left to be processed, then the component returns the newepoch variable. In some embodiments, a means for increasing the size of a filesystem object in accordance with the quota management system comprises one or more computers or processors configured to carry out an algorithm disclosed in FIG. 5 and this paragraph in the order described therein.

Figure 6:
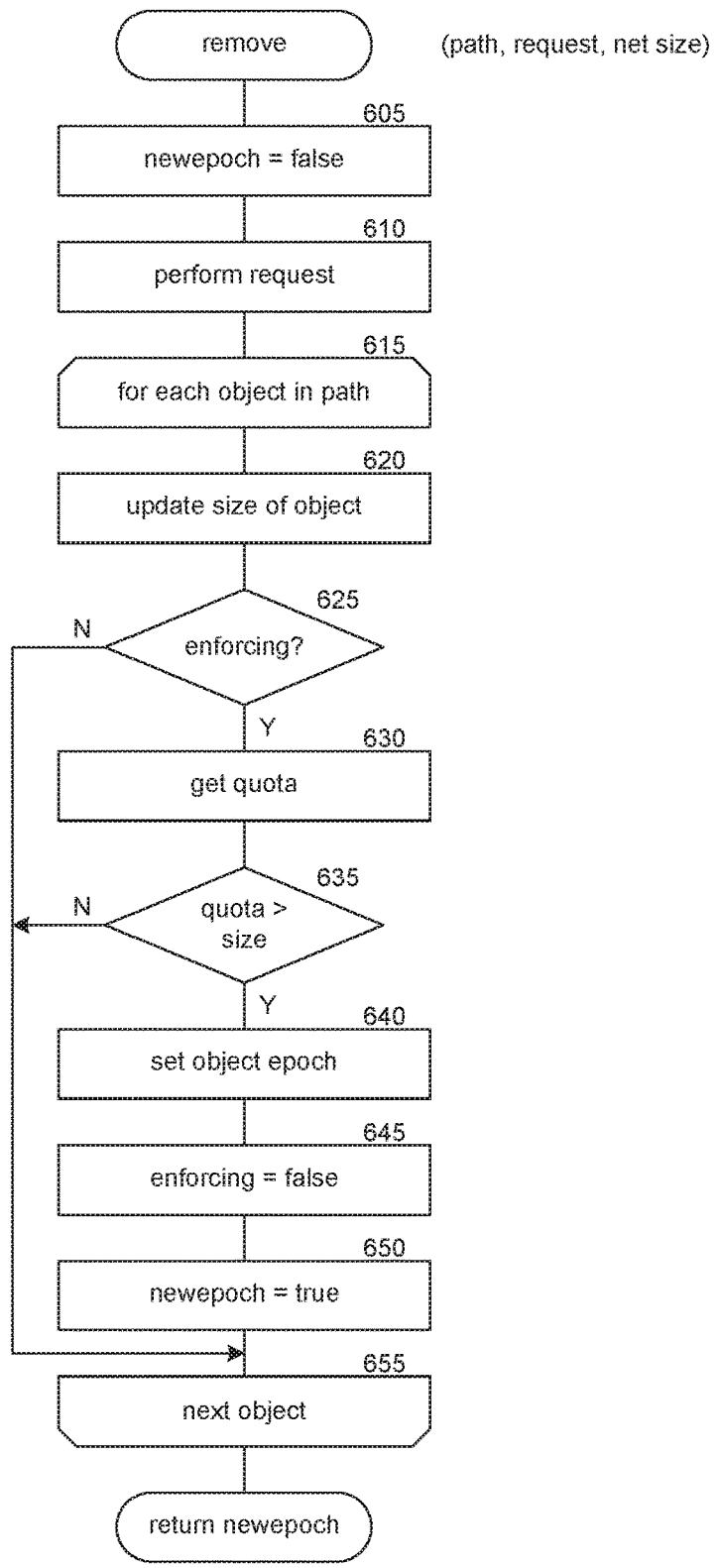
FIG. 6 is a flow diagram illustrating the processing of an add component.

FIG. 6 is a flow diagram illustrating the processing of a remove component in accordance with some embodiments of the disclosed technology. The remove component is invoked by a modify component to remove (or maintain the size of) information from a filesystem subject to the quota management system described herein in response to a request to modify a filesystem object. In this example, the component receives a "path" string to the filesystem object, a "net size" value corresponding to the net size of the information to be added to the filesystem, and an indication of the requested modification. In block 605, the component initializes a newepoch variable to false. In block 610, the component performs the modification request (e.g., performs the requested write or writes to the filesystem object). In blocks 615-655, the component loops through each filesystem object in the path to update size information for the selected filesystem object and to determine whether the modification will cause a filesystem object that is currently enforcing (i.e., that is current in violation of its quota) to come into compliance with the quota (i.e., drop under its quota). In block 615, the component selects the next filesystem object in the path, starting with the filesystem object that is the target of the modification request (i.e., the filesystem object identified by the received path string). In block 620, the component updates the size of the currently-selected filesystem object based on, for example, the net size of the requested modification. For example, if the currently-selected filesystem object is a directory, then the component updates an aggregate size of the currently-selected filesystem object by adding the received netsize value to the current aggregate value of the currently-selected filesystem object. In decision block 625, if the currently-selected filesystem object is currently enforcing (e.g., has an enforcing bit equal to true), then the component continues at block 630, else the component continues at block 655. In block 630, the component retrieves the quota for the currently-selected filesystem object. In decision block 635, if the retrieved quota is greater than the updated size of the currently-selected filesystem object (i.e., if the modification caused the currently-selected filesystem object to come into compliance with its quota), then the component continues at block 640, else the component continues at block 655. In block 640, the component sets the object epoch of the currently-selected filesystem object to the current system epoch counter value. In block 645, the component clears the enforcing bit for the currently-selected filesystem object (i.e., sets the enforcing bit to false). In block 650, the component sets the newepoch variable to true. In block 655, the component selects the next filesystem object in the path, if there are any remaining, and then loops back to block 615 to update size information for the next filesystem object and to determine whether the modification has caused it to come into compliance with its quota (if it is currently enforcing). If no filesystem objects in the path are left to be processed, then the component returns the newepoch variable. In some embodiments, a means for decreasing the size of a filesystem object in accordance with the quota management system comprises one or more computers or processors configured to carry out an algorithm disclosed in FIG. 6 and this paragraph in the order described therein.

Figure 7:
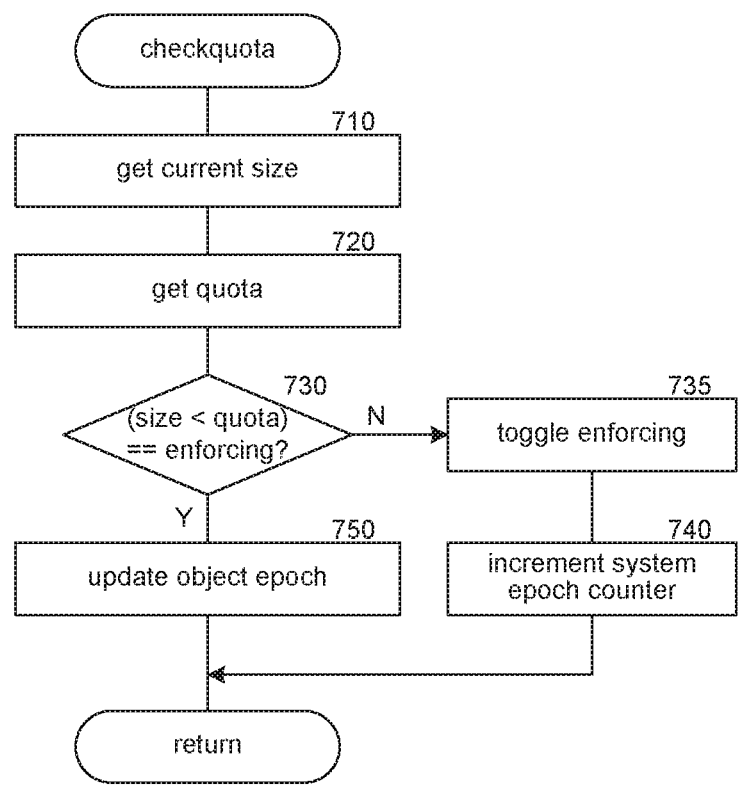
FIG. 7 is a flow diagram illustrating the processing of a checkquota component.

FIG. 7 is a flow diagram illustrating the processing of a checkquota component in accordance with some embodiments of the disclosed technology. The checkquota component is invoked by a reconciliation component of the filesystem during aggregate reconciliation for filesystem objects that have a quota. The component updates quota information for filesystem objects subject to the disclosed quota management system. In block 710, the component retrieves the current size of the filesystem object. In block 720, the component retrieves the quota for the filesystem object. In decision block 730, if the Boolean value (current size >quota) is equal to the enforcing bit for the filesystem object, then the component continues at block 735, else the component continues at block 750. In block 735, the component toggles the enforcing bit (i.e., if the enforcing bit is set the component clears it and if the enforcing bit is cleared it sets it). In block 740, the component increments the system epoch counter. In block 750, the component updates the filesystem object epoch value to the current system epoch counter value. In some embodiments, a means for performing quota reconciliation comprises one or more computers or processors configured to carry out an algorithm disclosed in FIG. 7 and this paragraph in the order described therein.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method for managing a file system in a shared storage system over a network, wherein instructions stored in a memory are executed by one or more processors to perform actions, comprising:
    instantiating a file system epoch counter associated with a plurality of file system objects; and
    instantiating a file system facility to perform actions, comprising:
        employing one or more of a plurality of storage devices of the shared storage system to provide access to the plurality of file system objects that are associated with one or more directories or files in the file system; and
    in response to receiving a request to modify a first file system object, performing actions, including:
        determining when one or more file system objects are current with a quota by employing the system epoch counter to compare a current epoch value to an epoch value previously associated with the first file system object, wherein the comparison reduces latency and computational resources that are employed to determine when one or more file system objects are current with the quota; and identifying, without having to traverse the entire file system, one or more file system objects that are non-current with the quota;
        when the comparison is equal, allowing an increase or a decrease in a size of the first file system object;
        when the comparison is unequal and one of the first file system object or one or more parent objects of the first file system object are enforcing the quota, disallowing the modification to the size of the first file object; and
        when the comparison is unequal and the one of the first file system object or the one or more parent objects of the first file system object are unenforcing the quota, allowing the modification in the size of the first file object.

2. The method of claim 1, wherein in response to receiving the request to modify the first file system object, performing further actions, including:
    when the comparison is unequal and one of the first file system object or one or more parent objects of the first file system object are enforcing an overage quota, disallowing the increase in the size of the first file object; and
    when the comparison is unequal and the of the first file system object or the one or more parent objects of the first file system object are enforcing an underage quota, disallowing the decrease in the size of the first file object.

3. The method of claim 1, further comprising:
    in response to receiving a quota value that is associated with the first file system object, performing actions, including:
    storing the quota value and an association of a current system epoch value with the first file system object; and
    determining whether the size of the file system object is greater than the quota value.

4. The method of claim 1, further comprising:
    in response to determining that the size of the first file system object relative to the quota exceeds a predetermined percentage value, notifying a user associated with the filesystem object.

5. The method of claim 1, further comprising storing the quota in a data structure that includes a quota value, an enforcing bit, and an epoch value associated with the first file system object.

6. The method of claim 1, further comprising determining the size of the first file system object based on an aggregate value from an inode of the first file system object.

7. A computer readable non-transitory storage media that stores instructions for managing a file system in a shared storage system over a network, wherein execution of the instructions by one or more processors performs actions, comprising:
    instantiating a file system epoch counter associated with a plurality of file system objects; and
    instantiating a file system facility to perform actions, comprising:

employing one or more of a plurality of storage devices of the shared storage system to provide access to the plurality of file system objects that are associated with one or more directories or files in the file system; and in response to receiving a request to modify a first file system object, performing actions, including:

determining when one or more file system objects are current with a quota by employing the system epoch counter to compare a current epoch value to an epoch value previously associated with the first file system object, wherein the comparison reduces latency and computational resources that are employed to determine when one or more file system objects are current with the quota; and identifying, without having to traverse the entire file system, one or more file system objects that are non-current with the quota;

when the comparison is equal, allowing an increase or a decrease in a size of the first file system object;

when the comparison is unequal and one of the first file system object or one or more parent objects of the first file system object are enforcing the quota, disallowing the modification to the size of the first file object; and when the comparison is unequal and the one of the first file system object or the one or more parent objects of the first file system object are unenforcing the quota, allowing the modification in the size of the first file object.

8. The media of claim 7, wherein in response to receiving the request to modify the first file system object, performing further actions, including:

when the comparison is unequal and one of the first file system object or one or more parent objects of the first file system object are enforcing an overage quota, disallowing the increase in the size of the first file object; and when the comparison is unequal and the of the first file system object or the one or more parent objects of the first file system object are enforcing an underage quota, disallowing the decrease in the size of the first file object.

9. The media of claim 7, further comprising:

in response to receiving a quota value that is associated with the first file system object, performing actions, including:

storing the quota value and an association of a current system epoch value with the first file system object; and determining whether the size of the file system object is greater than the quota value.

10. The media of claim 7, further comprising:

in response to determining that the size of the first file system object relative to the quota exceeds a predetermined percentage value, notifying a user associated with the filesystem object.

11. The media of claim 7, further comprising storing the quota in a data structure that includes a quota value, an enforcing bit, and an epoch value associated with the first file system object.

12. The media of claim 7, further comprising determining the size of the first file system object based on an aggregate value from an inode of the first file system object.

13. A system for managing a fife system in a shared storage system over a network, comprising:

a transceiver for communicating over the network;
a memory for storing instructions; and
one or more processors that execute the instructions to perform actions, comprising:

instantiating a file system epoch counter associated with a plurality of file system objects; and instantiating a file system facility to perform actions, comprising:

employing one or more of a plurality of storage devices of the shared storage system to provide access to the plurality of file system objects that are associated with one or more directories or files in the file system; and in response to receiving a request to modify a first file system object, performing actions, including:

determining when one or more file system objects are current with a quota by employing the system epoch counter to compare a current epoch value to an epoch value previously associated with the first file system object, wherein the comparison reduces latency and computational resources that are employed to determine when one or more file system objects are current with the quota; and identifying, without having to traverse the entire file system, one or more file system objects that are non-current with the quota;

when the comparison is equal, allowing an increase or a decrease in a size of the first file system object;

when the comparison is unequal and one of the first file system object or one or more parent objects of the first file system object are enforcing the quota, disallowing the modification to the size of the first file object; and when the comparison is unequal and the one of the first file system object or the one or more parent objects of the first file system object are unenforcing the quota, allowing the modification in the size of the first file object.

14. The system of claim 13, wherein in response to receiving the request to modify the first file system object, performing further actions, including:

when the comparison is unequal and one of the first file system object or one or more parent objects of the first file system object are enforcing an overage quota, disallowing the increase in the size of the first file object; and when the comparison is unequal and the of the first file system object or the one or more parent objects of the first file system object are enforcing an underage quota, disallowing the decrease in the size of the first file object.

15. The system of claim 13, further comprising:

in response to receiving a quota value that is associated with the first file system object, performing actions, including:

storing the quota value and an association of a current system epoch value with the first file system object; and determining whether the size of the file system object is greater than the quota value.

16. The system of claim 13, further comprising:

in response to determining that the size of the first file system object relative to the quota exceeds a predetermined percentage value, notifying a user associated with the filesystem object.

17. The system of claim 13, further comprising storing the quota in a data structure that includes a quota value, an enforcing bit, and an epoch value associated with the first file system object.

18. The system of claim 13, further comprising determining the size of the first file system object based on an aggregate value from an inode of the first file system object.

* * * * *